Jan. 7, 1936.                E. ATKINSON                2,027,011
                              INSET TAP
                         Filed March 18, 1935

Inventor:
Ernest Atkinson

Patented Jan. 7, 1936

2,027,011

UNITED STATES PATENT OFFICE 2,027,011

INSET TAP

Ernest Atkinson, Toronto, Ontario, Canada

Application March 18, 1935, Serial No. 11,584
In Canada April 11, 1934

1 Claim. (Cl. 225—44)

My invention is a new inset tap, which is sanitary, and has no outside attachments. The tap itself is enclosed in a cup, the front of which is protected by a door or cover. This cup, which contains the tap, lies flush with the outside wall of the container.

I attain these objects by the arrangement illustrated in the accompanying drawing, in which—

Similar letters refer to similar parts throughout the several views.

Figure 1:
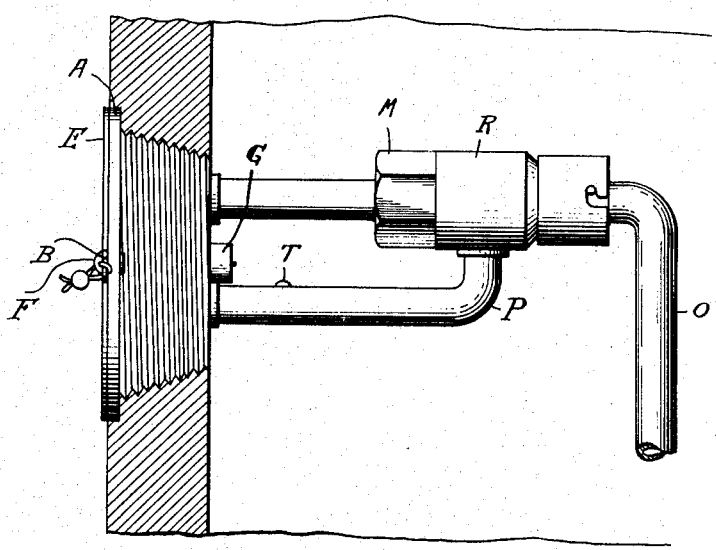
Fig. 1 is a longitudinal view of the whole device with interior detail omitted.

Referring to the drawing:

A description will first be given of the various parts of tap, and secondly the action.

Figure 2:
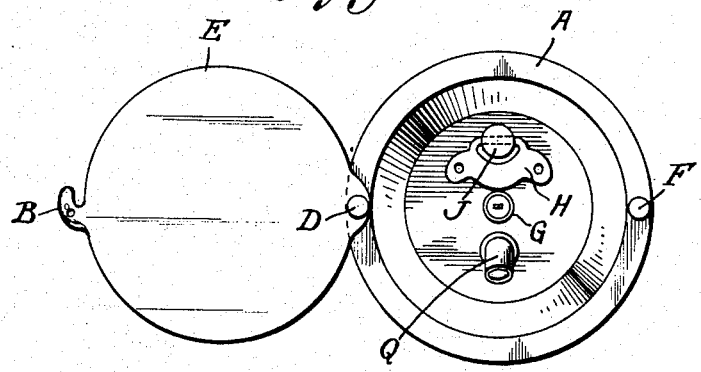
Fig. 2 is a front elevation of the cup, with the door open so as to show in elevation the parts housed therein.

The cup is represented by A. The sides of cup A are threaded to permit screwing said cup A into a wooden container. Attached to the front of cup A by the rivet D is the door E, as shown in Fig. 2, which is moved in a half-circle to close the front of cup A. By this motion the clutch B is then directly placed over rivet F as illustrated in Fig. 1. There are two slots, one being in rivet F and the other in catch B. As shown in Fig. 1 a wire is put through these slots for sealing purposes when the door is closed.

Figure 3:
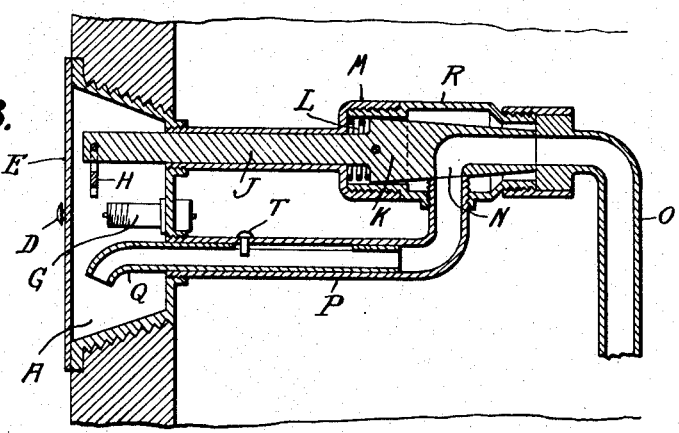
Fig. 3 is a longitudinal section of the whole device.

Referring to Fig. 3, air is pumped through the air valve G, to assist the flow of liquid. The key H is attached to the valve plug extension J.

As shown in Fig. 3, the spring L holds the valve plug K down and fits in between the nut and tube M and the valve plug K, holding the valve plug K in position.

The passage N, as shown in Fig. 3, allows the liquid to be drawn from the pipe O, through the passage N to the outlet tube P leading to the faucet Q.

As shown in Fig. 3, the valve plug K is inserted into the valve case R, and the pipe O is attached to the valve case R. The valve case R is threaded at the top to allow the nut and tube M to be attached. Also the valve case R is slotted to allow the valve plug K to make a quarter turn.

The faucet Q, as shown in Fig. 3, is inserted in the outlet tube P. The rivet T engages in the groove in the faucet Q to allow the latter to extend beyond the container.

To make clearer the working of the tap, the action will be briefly stated.

Remove the wire, which is fastened through the slots in rivet F and catch B. Slide the door E in an upward, half-circular motion, permitting a view of the interior of the cup A. Draw the faucet Q free of the cup A. Make a quarter turn of key H, attached to the valve plug extension J, which permits the flow of liquid from the pipe O into the passage N, and then into the outlet tube P, and then through the faucet Q into the receptacle.

To close off the flow of liquid return the key H to original position, and it can be left thus until next used.

One can readily see that this tap not only can be used in a wooden container, but can serve equally well in any need where it is necessary to conceal a tap when it is not in actual use.

What I claim as my invention, and desire to secure by Letters Patent is:—

An inset tap comprising, in combination, a cup adapted to be attached to a container, a rim on said cup lying flush with said container, a door closing the cup, sealing means for said door, an air valve in the cup, a dispensing valve casing communicating with the cup, a valve plug in said casing, an extension thereto terminating in a key, a spring holding the valve plug in position in the casing, a pipe communicating with the casing and with the interior of the container, an extensible faucet in said cup communicating with said casing, a passage in the valve plug adapted upon turning of the key to open or close communication between the casing and the faucet for dispensing liquid from the container.

ERNEST ATKINSON.